United States Patent [19]

Fox

[11] Patent Number: 5,069,796

[45] Date of Patent: Dec. 3, 1991

[54] SYSTEM FOR REMOVING VOLATILE COMPONENTS FROM WATER DERIVED FROM WELLS

[76] Inventor: James R. Fox, 8737 Heathwood Bend, Knoxville, Tenn. 37923

[21] Appl. No.: 519,641

[22] Filed: May 7, 1990

[51] Int. Cl.⁵ .............................................. B01D 15/04
[52] U.S. Cl. ................................... 210/664; 210/669; 210/678; 210/747; 210/694; 210/140; 210/143; 210/170; 210/241; 210/257.1; 210/277; 210/259; 210/295
[58] Field of Search ............... 210/664, 669, 241, 264, 210/170, 747, 140, 678, 143, 275, 277, 257.1, 259, 295, 694

[56] References Cited

U.S. PATENT DOCUMENTS

| | | | |
|---|---|---|---|
| 4,228,000 | 10/1980 | Hoeschler | 210/140 |
| 4,383,920 | 5/1983 | Muller et al. | 210/241 |
| 4,514,294 | 4/1985 | Layman et al. | 210/241 |
| 4,534,869 | 8/1985 | Seibert | 210/241 |
| 4,536,845 | 8/1985 | DeVale et al. | 210/140 |
| 4,544,488 | 10/1985 | O'Brien | 210/664 |
| 4,608,163 | 8/1986 | Yohe et al. | 210/170 |
| 4,659,460 | 4/1987 | Muller et al. | 210/241 |
| 4,676,908 | 6/1987 | Ciepiela et al. | 210/667 |
| 4,764,272 | 8/1988 | Fox | 210/104 |
| 4,814,074 | 3/1989 | Auchincloss | 210/259 |
| 4,892,664 | 1/1990 | Miller | 210/170 |

Primary Examiner—Stanley S. Silverman
Assistant Examiner—Cynthia L. Nessler
Attorney, Agent, or Firm—Pitts & Brittian

[57] ABSTRACT

A unitized system for the processing of well water that is contaminated with volatile substances, such as organic substances, at a site where the contaminated water exists. This system has the primary components thereof mounted on a skid/frame that can be transported to the site. In the preferred form, the contaminated water is first processed in a spray tower where it is countercurrently contacted with air to remove the volatile contaminants. This air-treated water then is passed through an activated carbon bed for further purification before being used. While the treated water is not considered safe for human consumption, it can be used for most other uses. The system is controlled to normally operate only upon water demand by the system being supplied. Since activated carbon can cause the gradual growth of bacteria, the system is provided with a system for the periodic back flushing of the carbon bed, with the wash water being discarded in a separate holding tank or to a local sewer. Pressurization is preferably performed to make the outlet line compatible to many systems employing pressurized water lines.

14 Claims, 2 Drawing Sheets

SYSTEM FOR REMOVING VOLATILE COMPONENTS FROM WATER DERIVED FROM WELLS

TECHNICAL FIELD

This invention relates to the removal of volatile substances from water, and more particularly to a portable system for the removal of volatile organics and other like materials from water derived from wells.

BACKGROUND ART

Discussed in my U.S. Pat. No. 4,764,272, entitled "Apparatus for Recovery of Hydrocarbons from Hydrocarbon/Water Mixtures", issued on Aug. 16, 1988, is apparatus for processing water from various sources where there is a major contamination of the water with hydrocarbons, both dissolved and mixed. This is of primary use where a major portion of the contamination can be removed by permitting the mixture to settle so that the hydrocarbons accumulate on the top of water in a tank. Some dissolved and volatile organics are removed in a spray tower.

Well water is occasionally contaminated with less concentrated organic substances that make the water unusable for any purpose. The typical organic substances that are encountered are the benzenes (carcinogenic), toluenes (toxic) and xylenes (toxic). The Federal upper limit for the benzenes is five parts per billion. The problem may be a temporary one for the well, or it may persist essentially permanently. Usually the solution is to dig a new well; however, the problem can sometimes be solved by completely depleting the water in the well such that the new water seeping into the well will be free of the contamination. This complete pumping process may have to be done several times before the water can then be used for any purpose, and particularly for human consumption. However, whichever solution is chosen, there is a time period when no water is available for use. The only solution to this has been to transport water from a contamination-free source.

Accordingly, it is an object of the present invention to provide a water treatment system that can be at least temporarily utilized to remove volatile contaminants from the water such that it can be used for many purposes except for human consumption.

It is another object of the present invention to provide a portable and unitized water treatment system that can be moved to a site where water is to be treated for the removal of volatile organic materials and the like from well water.

Another object of the present invention is to provide a portable and unitized water treatment system that utilizes a spray tower in conjunction with an activated carbon bed for the removal of volatile organic materials and the like from well water at a given site so as to provide water that can be used for purposes other than for human consumption.

These and other objects of the present invention will become apparent upon a consideration of the drawings that follow, together with a complete description thereof.

DISCLOSURE OF THE INVENTION

In accordance with the present invention, and in a preferred form, there is provided a unitized water treatment apparatus (and method of operation) that can be transported to a site where the removal of volatile organics from well water is desired. This apparatus has a base, or mounting skid, upon which are mounted a packed spray tower, an activated carbon bed, a pressurization tank and associated water handling equipment. Upon water demand, a pump within a well brings the contaminated water into the top of a spray tower where it flows countercurrent to up-flow air causing the volatile constituents to be discharged with the air. The air-treated water is pumped, from a collection reservoir into the activated carbon bed and thence to the point of water demand (e.g., to house plumbing). The pressurization tank maintains appropriate pressure in the system such that the water system of the house remains properly pressurized. Periodically water flow through the activated carbon bed is reversed to discharge, to a separate reservoir or drain, materials that are accumulated on the bed. Controls are contained on the portable unit for the operation of the necessary components needed for the water treatment and delivery.

BEST MODE FOR CARRYING OUT THE INVENTION

Figure 1:
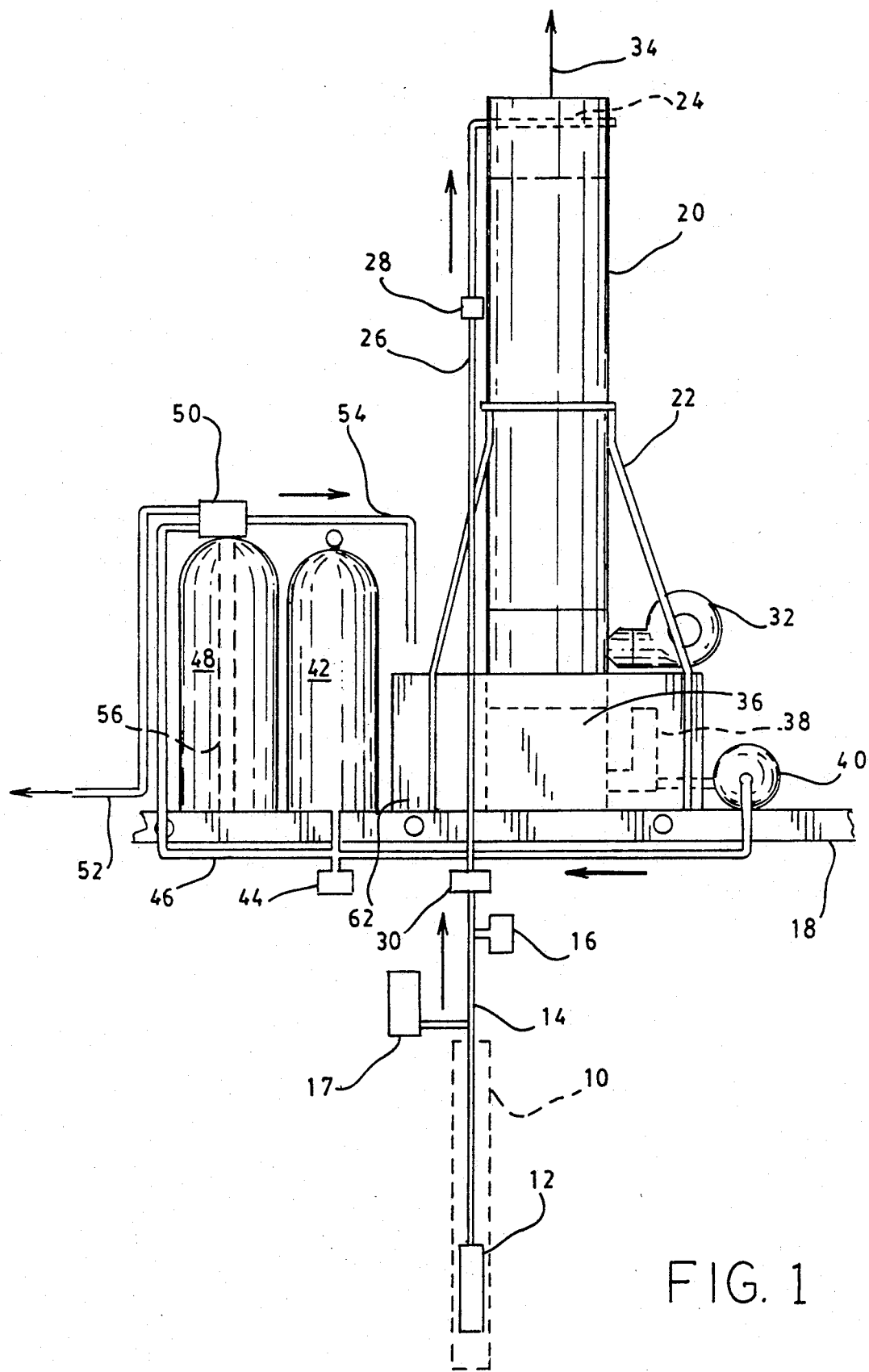
FIG. 1 is a schematic drawing depicting the essential system components of the present invention as mounted on a skid for transport of the system to a selected site.

A schematic drawing of the components for carrying out the present invention is presented in FIG. 1. A well 10 that contains water that is potentially contaminated with dissolved volatile organic materials is shown as containing a well pump at 12. This pump 12, in most cases, would be already installed in the well; however, in some installations, a new pump may be installed at a level for most effectively removing the water from the well. A pump discharge line 14 typically contains a pressure switch 16, normally set to about 30 to 50 psi. Also, there is typically a pressure tank 17. This switch and pressure tank, also, can be parts of the original installation at the well or can be added to facilitate the operation of the present invention.

As stated above, one of the objects of the present invention is to have a unitized processing unit. Towards this end, there is provided a support in the form of a skid or other platform 18. This platform with the various components already mounted thereon, can be transported to the site by any suitable means, as on a trailer, truck, etc. Mounted on this platform 18 is an upright packed tower 20 which is generally cylindrical in shape. Typically, the tower is held in an upright orientation by a plurality of braces 22. This tower typically contains spherical polypropylene packing as obtained from the Jaeger Products Co. Mounted in the top of the tower is a spray nozzle 24 that is attached to a tower feed line 26. This feed line typically contains a solenoid valve 28, and typically is connected to the pump discharge line 14 with a connector 30 so as to permit initial attachment to the pump as well as serve as a disconnect when the apparatus on the platform 18 is no longer required at the site. Up-flow air (typically 800 cfm) is supplied to the tower with a blower 32 so that water from the spray nozzle 24 is contacted with the air to remove volatile components for discharge into the air, as indicated at 34.

The bottom twenty-four inches of the tower 20 is a tower reservoir 36 to collect water (at atmospheric pressure) that has been processed. This reservoir is provided with conventional level control means 38 for purposes discussed below with regard to the operation of the present invention. There is a pressure pump 40 connected to draw water from the reservoir 36 upon water demand. This pump raises the water pressure to a range of 30-50 psi, with this pressure being maintained by a pressure tank 42. A pressure switch 44 controls this pressure within the desired range. This pressurized water is delivered, through line 46 to a tank 48 containing activated carbon. Typically this is 8×12 mesh activated carbon as available from American Norit Company. Any suspended solids within the water, as well as other contaminants that have an affinity with the carbon, are removed in this tank. Since bacteria often grows on the activated carbon, provision is made to back-flush the bed. This feeding and back-flushing is controlled by a directional flow valve 50 such that processed water leaves the bed through line 52, and the product stream of the back-wash is through line 54 to a separate storage pan 62.

While the direction of flow within the tank 48 is illustrated as being down through the bed of activated carbon and then up through a standpipe 56, flow could be in the opposite direction. In this case, the flow of the back-wash would be reversed, as well.

Figure 2:
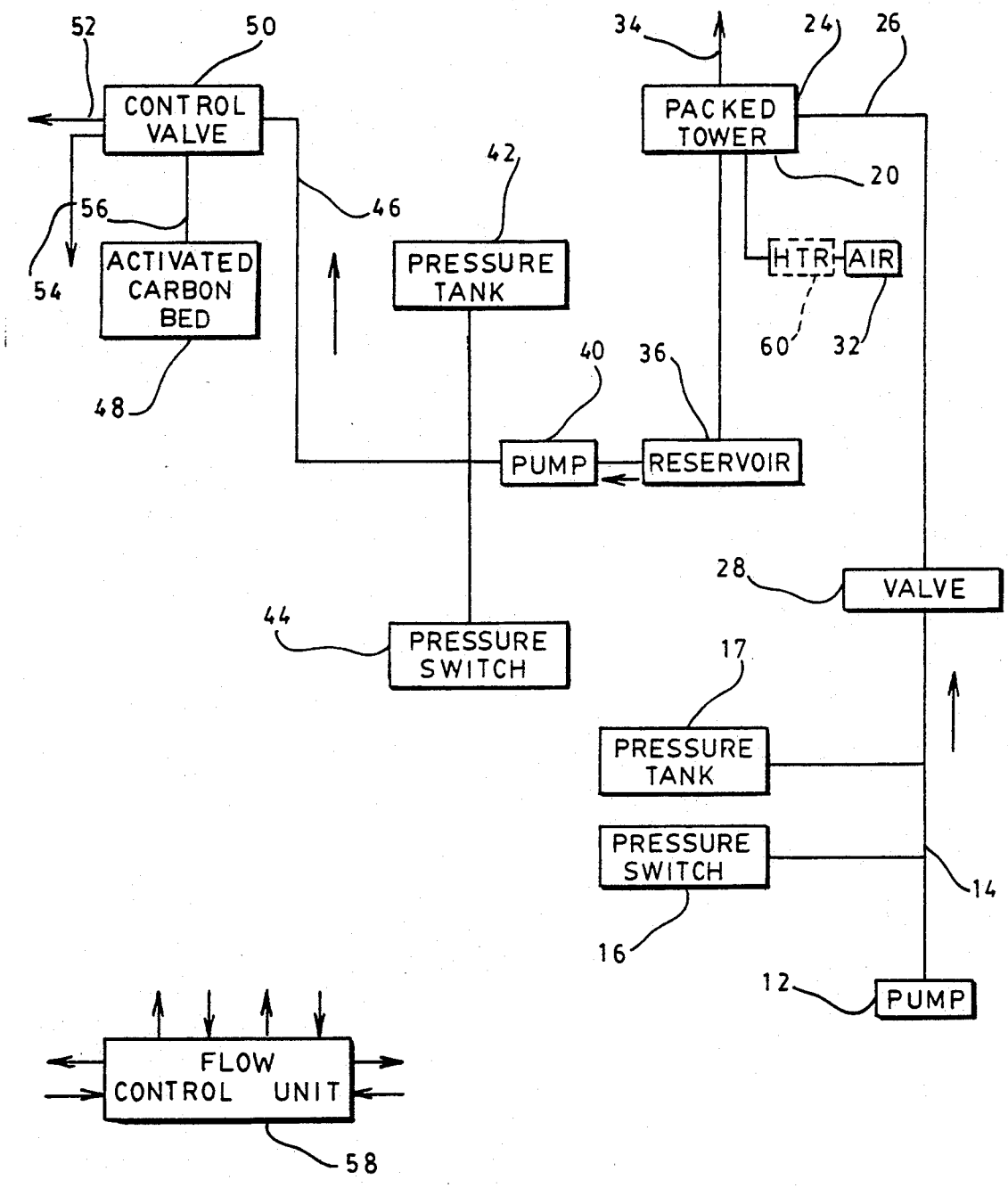
FIG. 2 is a block diagram flow chart for the apparatus of FIG. 1 for a better understanding of an operation thereof.

The operation of the apparatus of FIG. 1 can be best explained by reference to the block diagram of FIG. 2. Overall control is established by a control system generally indicated at 58. A person skilled in the art, after a review of the desired operation of the present invention, would be aware of the controls that are necessary for this control system 58. When there is a demand for water by some "user" attached to product line 52, the pump 40 is started as soon as the pressure of the product system drops below the set point (e.g., 30 psi). This action of the pump 40 causes a lowering of the water level in reservoir 36 until, through the operation of the level detection means 38, the solenoid valve 28 is opened and the well pump 12 operated. The operation of the well pump 12, and the opening of the valve 28, permits the flow of water from the well through line 26 to the nozzle 24 in the top of the tower. Within the tower this contaminated water is sprayed onto the packing, and air is caused to flow upwardly through the packing under the action of the blower 32. This removes the volatile contaminants from the water, with the processed water being added to that already in the reservoir 36. If desired or necessary, a heater means 60 can be used to raise the temperature of the air to increase the volatility of the organic contaminants. If the level in the reservoir 36 becomes excessive, the well pump 12 is shut off and the solenoid valve 28 is closed.

As water is withdrawn from the reservoir 36, it is pressurized by the pump 40 and forced through line 46 to the top of the activated carbon bed 48. The water passes through the bed to near the bottom thereof, and then flows up through the standpipe 56 to enter the line 52 to supply the demand. This flow continues, as regulated by the flow control unit 58, until the demand ceases whereupon the system is shut down when the reservoir 36 is sufficiently filled so as to be available for supplying water when the demand is again created. At any time that the pressure within all or a portion of the pressurized sections reaches the upper set limit (e.g., 50 psi), that section(s) is shut off until the pressure returns to within the desired and set range (under action of the pressure switches 16 and 44).

Periodically, or upon demand, the activated carbon bed 48 is back-washed to remove any contaminants held thereon. This will include, for example, any solids removed from the water and any bacteria that tends to grow on the carbon. The control valve 50 is operated such that a "false demand" is created on the system. Under this condition, water is passed from the reservoir 36 by the pump 40 so as to force water down through the standpipe 56 and back up through the activated carbon bed. The effluent of this back-wash then passes through line 54 to a second reservoir 62 on the platform, or to a sewer, etc. This back-wash is stopped after a few minutes, and the system is then ready for the regular processing of water upon the next demand cycle.

A system according to the above description has been tested for effectiveness in the removal of volatile organic substances from well water. A test water source containing more than 1,049 parts per billion benzene was processed in the described apparatus. The product water contained less than 1 ppb (part per billion) benzene.

From the foregoing it will be understood that a unitized system has been developed for the treatment of well waters contaminated with volatile substances such as volatile organics. It can be delivered to site and quickly put into operation to provide treated water that can be used for most purposes other than human consumption. Although certain materials are listed as examples in carrying out the invention, these are not given as a limitation of the present invention. Rather, the invention is to be limited only by the appended claims and their equivalents when taken together with a complete description of the invention.

I claim:

1. A system for receiving well water from a well pump, said well water contaminated with volatile substances, said system for the removal of said volatile substances from said well water, which comprises:
   a spray tower means for receiving said well water from said well pump, said spray tower provided with spray means for dispersing said water within said spray tower means;
   air flow means for passing air through said spray tower means countercurrently to said water from said spray means;
   reservoir means disposed at a bottom portion of said spray tower means for receiving water after contact with said air, said water collected in said reservoir being substantially devoid of said volatile substances;
   an activated carbon bed means;
   a pump means for receiving water from said reservoir means and delivering said water from said reservoir means to said activated carbon bed means;
   control valve means for controlling direction of flow of said water from said pump means through said activated carbon bed means; and
   a flow control means to initiate flow of said contaminated water to said spray tower means and initiate operation of said pump means to deliver water to said carbon bed means upon demand.

2. The system of claim 1 wherein said spray means disperses said water downwardly within a top portion of said spray tower, and said air flow means passes said air upwardly through said spray tower.

3. The system of claim 1 wherein said reservoir means is provided with a water level control means so as to maintain an adequate supply of water from said spray tower means for pumping by said pump means to said carbon bed means.

4. The system of claim 1 wherein said control valve means for controlling direction of flow of said water through said activated carbon bed directs said flow of said water in a first direction during a selected time period to produce a product water that is substantially free of said contaminants, and in a second and opposite direction during a second time period to produce a waste water that contains contaminants that are back-flushed from said activated carbon bed means by said flow of water in said opposite direction.

5. The system of claim 4 wherein said first direction of water flow through said carbon bed means is downwardly through said carbon bed means, and said second direction is upwardly through said carbon bed means.

6. The system of claim 1 further comprising a pressurizing means for pressurizing water entering said activated carbon bed means whereby said product water has a pressure sufficient for subsequent use.

7. The system of claim 6 wherein said pressurizing means comprises a pressurization tank and a pressure regulating switch that operate in combination with said pump means whereby said product water is maintained at a pressure as determined by settings of said pressure regulating switch.

8. The system of claim 6 wherein said spray tower means, said air flow means, said reservoir means, said pressurizing means, said activated carbon bed means, said pump means and said control valve means are mounted on a portable base whereby said system can be transported as a unitized system to a site of said contaminated well water.

9. A system for the removal of volatile contaminant substances from water within a well which contains said volatile contaminant substances, which comprises:
a well pump positioned within said well containing said contaminated water;
a transportable base member;
a spray tower means mounted on said base member for receiving said well water from said well pump, said spray tower provided with an inlet line connecting said well pump to a spray means for dispersing said water downwardly within a top portion of said spray tower means;
air flow means attached to said spray tower means for passing air upwardly through said spray tower means countercurrently to said water from said spray means;
reservoir means disposed at a bottom portion of said spray tower means for receiving water after contact with said air, said water collected in said reservoir being substantially devoid of said volatile contaminant substances, said reservoir means provided with a water level detection means;
an activated carbon bed means mounted on said base member;
a pressurizing means mounted on said base member;
a pump means mounted on said base member for maintaining pressure in said pressurizing means and for receiving water from said reservoir means and delivering said water from said reservoir means to said activated carbon bed means under pressure; and
control valve means attached to said activated carbon bed means for controlling flow of said water from said reservoir means through said activated carbon bed means in a first direction during a first time period to produce a product water from said carbon bed means that is substantially free of said contaminants, and in a second and opposite direction during a second time period to produce a waste water that contains contaminants that are back-flushed from said carbon bed by said flow of water in said opposite direction.

10. The system of claim 9 further comprising a flow control means mounted on said base member to initiate flow of said contaminated water by said well pump to said spray tower means and initials operation of said pump means to deliver water to said carbon bed means upon demand.

11. The system of claim 9 wherein said first direction of water flow through said carbon bed means is downwardly through said carbon bed means, and said second direction is upwardly through said carbon bed means.

12. A system for the removal of volatile contaminant substances from water within a well which contains said volatile contaminant substances, which comprises:
a well pump positioned within said well containing said contaminated water;
a portable base member;
a spray tower means mounted on said base member for receiving said well water from said well pump, said spray tower provided with an inlet line connecting said well pump to a spray means for dispersing said water downwardly within a top portion of said spray tower means;
air flow means attached to said spray tower means for passing air upwardly through said spray tower means countercurrently to said water from said spray means;
reservoir means disposed at a bottom portion of said spray tower means for receiving water after contact with said air, said water collected in said reservoir being substantially devoid of said volatile contaminant substances, said reservoir means provided with a water level detection means;
an activated carbon bed means mounted on said base member;
a pressurizing means mounted on said base member;
a pump means mounted on said base member for maintaining pressure in said pressurizing means and for receiving water from said reservoir means and delivering said water from said reservoir means to said activated carbon bed means under pressure;
control valve means attached to said activated carbon bed means for controlling flow of said water from said pump means through said activated carbon bed means in a downwardly direction during a first time period to produce a product water from said carbon bed means that is substantially free of said contaminants, and in a second and upwardly direction during a second time period to produce a waste water that contains contaminants that are back-flushed from said carbon bed by said flow of water in said opposite direction; and
a flow control unit mounted on said base means for receiving a signal indicating a demand for said product water and, upon receipt of said signal, operating said control valve means, initiating flow of said contaminated water to said spray tower and initiating operation of said pump means for delivering said water from said reservoir means to said activated carbon bed means under pressure to supply said product water.

13. A method for the removal of volatile contaminant substances from well water within a well which contains said volatile contaminant substances, which comprises the steps:

automatically initiating a flow of water containing said volatile contaminant substances from said well into a spray tower means upon demand, said automatic initiating step being actuated by a flow control unit;

spraying said water containing said volatile contaminant substances within said spray tower means;

passing air through said spray tower means countercurrently to said water spray within said spray tower means to substantially remove said volatile contaminant substances from said contaminated well water;

collecting water after contact with said air;

automatically pumping said collected water under pressure through a bed of activated carbon in a first direction upon demand to produce a product water devoid of said contaminants, said automatic pumping step being actuated by said flow control unit; and periodically pumping said collected water under pressure through said bed of activated carbon bed in a direction opposite said first direction to back flush said activated carbon bed to remove contaminants on said activated carbon bed to produce a waste stream for discharge.

14. The method of claim 13 wherein said spraying step directs said spray downwardly through said spray tower means, wherein said passing of air step directs air upwardly through said spray tower means, wherein said first direction of flow through said activated carbon bed is downwardly through said bed, and said opposite direction is upwardly through said activated carbon bed.

* * * * *